United States Patent [19]

von Broock

[11] Patent Number: 4,889,207
[45] Date of Patent: Dec. 26, 1989

[54] ELASTIC BEARING FOR A DRIVING ASSEMBLY OF A MOTOR VEHICLE

[75] Inventor: Ulrich von Broock, Weissach, Fed. Rep. of Germany

[73] Assignee: Dr. Ing. h.c.F. Porsche Aktiengesellschaft, Weissach, Fed. Rep. of Germany

[21] Appl. No.: 157,954

[22] Filed: Feb. 19, 1988

[30] Foreign Application Priority Data

Feb. 21, 1987 [EP] European Pat. Off. ........ 87102493.1

[51] Int. Cl.⁴ ................................................. B60K 5/00
[52] U.S. Cl. ..................................... 180/291; 180/292; 180/312; 248/638; 267/292
[58] Field of Search ............... 180/291, 292, 297, 299, 180/300, 312; 267/292, 140.1, 141; 248/562, 634, 636, 638

[56] References Cited

U.S. PATENT DOCUMENTS

| 1,944,248 | 1/1934 | Lee et al. ............................ 180/292 |
| 2,084,080 | 6/1937 | D'Aubarede ........................ 180/300 |
| 4,203,499 | 5/1980 | Miyata ................................ 180/312 |
| 4,449,603 | 5/1984 | Langwieder et al. ............... 180/297 |
| 4,726,573 | 2/1988 | Hamaekers et al. ................ 180/300 |

FOREIGN PATENT DOCUMENTS 1405410 11/1968 Fed. Rep. of Germany .
445445 6/1912 France .
7309246 10/1974 France .
2540800 8/1984 France .
295129 12/1986 Japan ................................... 180/300

Primary Examiner—Charles A. Marmor
Assistant Examiner—Eric Culbreth
Attorney, Agent, or Firm—Barnes & Thornburg

[57] ABSTRACT

An elastic bearing assembly for a driving assembly of a motor vehicle with at least engine and transmission side bearing arrangements, for holding the driving assembly with dampening of vibrations. In special arrangement, the motor or engine side bearings as well as the transmission side bearings exhibit different spring stiffness which are configured with respect to one another that the vertical vibration movements of the assembly are coupled with a rotational vibration movement about an assembly cross axis. Further the bearings are so arranged and configured that all other possible vibration or movement forms of vertical and rotational movement are substantially decoupled. During dampening of vibrations of the assembly caused by an external disturbance, respectfully all in and out spring movements of the harder bearings are hindered by an overlapping second higher frequency movement. A bearing arrangement of this type results in an advantageous quick dampening of vibrations.

5 Claims, 2 Drawing Sheets

ELASTIC BEARING FOR A DRIVING ASSEMBLY OF A MOTOR VEHICLE

BACKGROUND AND SUMMARY OF THE INVENTION

The invention relates to an elastic bearing for a drive assembly of a motor vehicle of the type having bearings at the motor and transmission sides for holding the drive assembly with vibration dampening.

In a motor vehicle the drive assembly is excited to strong body vibrations because of the travel surface unevenness. With a view toward minimizing the affect of these vibrations on the travel comfort, it is provided in a known manner to so construct the aggregate bearing system that the different vibration forms are decoupled as far as possible from one another, for example so that the vertical vibrations (bouncing) are separated from the tilting vibrations.

It has been determined that, especially a decoupling of the vertical vibrations results in an easily excitable vibration due to the road surface unevenness and therefore disadvantageously affects the driving comfort.

An object of the invention is to construct an elastic bearing arrangement for a driving assembly of a motor vehicle, which through an advantageous vibration relationship of the driving assembly assures a good driving comfort.

This object is inventively achieved according to the following characteristics;

a. the bearing arrangement at the engine side and the bearing arrangement at the transmission side exhibit different respective spring stiffnesses;

b. these different spring stiffnesses of the bearing arrangement are so coordinated with respect to one another that the vertical movements of the driving assembly are substantially coupled with rotational movement about an assembly cross axis;

c. the bearing arrangements are so disposed and configured that all other possible vibration movement forms are substantially decoupled from the vertical and rotational movements; and d. during dampening of the assembly vibrations caused by external forces respectively all in or out spring movements of the harder bearing arrangement are retarded by a second higher frequency movement.

The advantage of the invention consists therein that a very quick reduction in the externally excited driving assembly vibrations is achieved through an advantageous relationship of the vibration movements. This vibration movement relationship is achieved essentially through a coupling of the vertical and rotational or tipping movements. This results from an arrangement characterized that:

a. the bearings are arranged approximately at the level of the center of gravity in order that further vibration forms, such as for example rotating vibration of the assembly about other axes are separated as desired, b. the distance between the bearings at the motor side and the transmission bearing is as great as possible in order to have achieved a higher frequency of the rotational movement or vibration about the assembly cross axes, c. the bearings at the motor side and the transmission exhibit different stiffness in order that the required frequency relationship of the two vibration forms and the ratio of 1 to 2 is achieved, d. the softer bearing is controlled to be very strongly damped.

Also for transversely constructed motors the advantages of the invention can be similarly achieved, whereby for this type of motor arrangement respectively only one motor bearing and one transmission bearing are used.

Other objects, advantages and novel features of the present invention will become apparent from the following detailed description of the invention when considered in conjunction with the accompanying drawings.

DETAILED DESCRIPTION OF THE DRAWINGS

Figure 1:
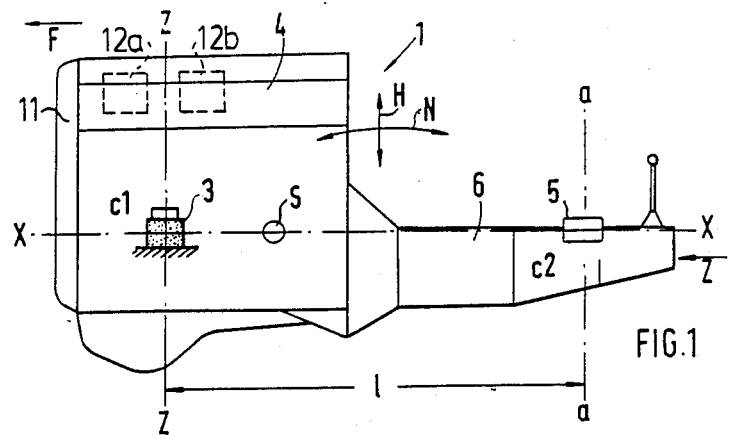
FIG. 1 is a side schematic view of a driving assembly inserted in the longitudinal vehicle direction and provided with a bearing arrangement including bearings at the motor side and bearings at the transmission side, constructed in accordance with a preferred embodiment of the present invention.
Figure 2:
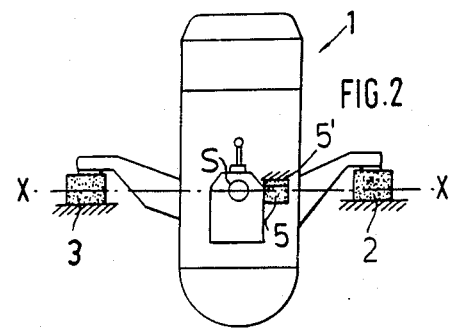
FIG. 2 is a view of the driving assembly of FIG. 1 as seen in the direction of arrow Z.

According to FIGS. 1 and 2 a driving assembly 1 including an engine 4 having a front wall 11 as well as a plurality of cylinders 12 and transmission 6, which driving assembly is disposed in the longitudinal direction of a vehicle, exhibits a bearing arrangement with two bearings 2 and 3 at the engine side 4 and one bearing 5 at the transmission side 6. The bearings 2, 3 and 5 are arranged in a horizontal plane X—X which extends through the center of gravity S of the entire driving assembly. With other preferred embodiments having transversely arranged engines, the bearing at the engine side is arranged above the center of gravity.

The bearings 2, 3 and 5 comprise, for example, rubber-type bearings and are arranged behind one another in the travel direction F with a large as possible distance 1. This is achieved with a disposition and displacement of the engine bearings 2 and 3 in the region of a transfer separating plane ZZ between a first cylinder 12a and second cylinder 12b of the engine 4 and a disposition of the transmission bearing 5 in an outer most swinging arm region aa of transmission 6.

The bearings 2 and 3 at the engine side exhibit different spring stiffness characteristics than the bearing 5 at the transmission side. In a preferred embodiment, the bearings 2 and 3 at the engine side are constructed so as to be relatively soft and the bearing 5 at the transmission side is harder. Alternative embodiments are also contemplated where the arrangement of the spring stiffness of the bearings is such that the transmission side bearing 5 is softer than the engine side bearings 2 and 3.

This different bearing stiffness of the bearings 2, 3 and 5 is so arranged with respect to one another that the vibration movements caused by the external aggregate are developed as coupled vertical and tilting movements so that a vertical movement alone is no more excitable or possible.

Figure 3:
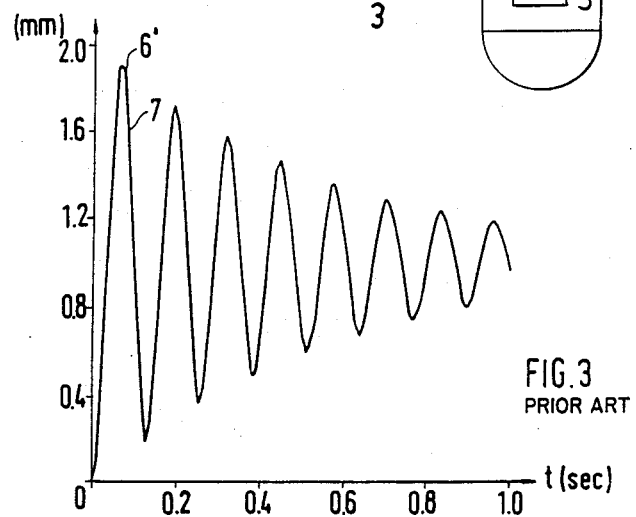
FIG. 3 is a schematic view of a damping curve according to an arrangement of the state of the art with decoupled vertical and pivoting vibration movements.

The graph of FIG. 3 shows the damping procedure of a driving aggregate, constructed according to the state of the art, with the vertical movements 6 separated from the tilting movement 7, so that no conflicting influence of the two vibration movement forms can be achieved. The damping procedure ends after a short time span, which is shown on the abscissa. Also, with such a known damping process the spring path of the bearings shown on the ordinant are relatively large.

A desired coupling of the vertical and tilting movements of the apparatus according to the invention are achieved when the following conditions are provided: the forwardly disposed motor bearings 2 and 3 exhibit respectively a spring stiffness of, for example 300 N/mm and the rearwardly disposed transmission bearing 5 exhibits a smaller spring stiffness of, for example 80 N/mm. The engine bearings 2 and 3 are disposed at the level of the center of gravity S and exhibit a bearing position in the region between the front wall of the motor and a separating plane Z—Z between the first and the second cylinder of the engine 4. The transmission side bearing 5 is arranged with respect to the forwardly disposed engine bearings 2 and 3 so as to have the maximum distance 1, but should also because of acoustic grounds advantageously be disposed in the swinging arm region aa.

With this arrangement and configuration of the bearings 2, 3 and 5, the vertical vibration movement H and the tilting vibration movements N of the decoupled aggregate exhibit a frequency relationship of 1:2.

Figure 4:
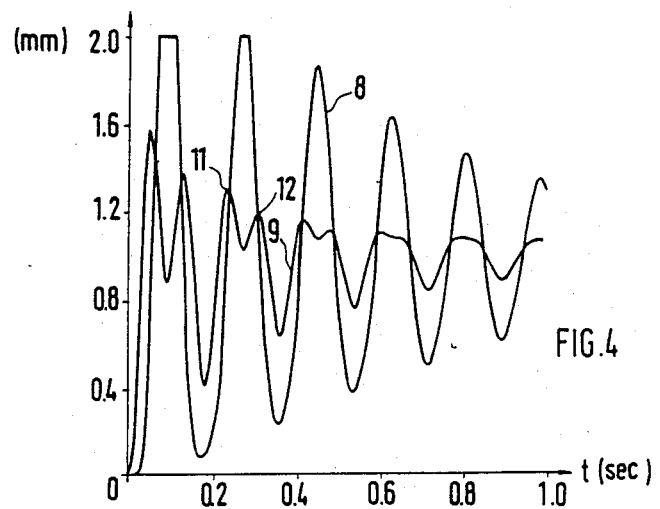
FIG. 4 is a graph showing the arrangement of the invention with weakly damped bearings.

It is to be noted or recognized in the illustration of FIG. 4 the curves of 8 and 9 of the vibration damping relationship of the vertical and tilting movements of the coupled aggregates is again shown. The in and out spring movement of the transmission bearing 5 is illustrated by the curve 8 and the in and out spring movement of the engine bearings 2 and 3 is illustrated by the curve 9.

As the curves 8 and 9 according to FIG. 4 further show, it is achieved that the damping of the harder bearings, in the illustrated example of the engine bearings 2 and 3, is abruptly prevented through the coupled vertical and tilting vibration movements of higher frequency.

Figure 5:
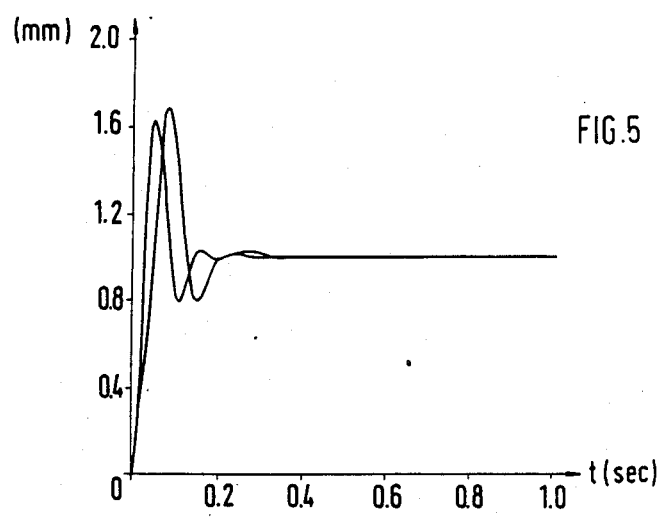
FIG. 5 is a graph according to claim 4 with strongly damped transmission bearings.

If the bearing for the transmission is strongly damped, for example by conventional hydraulic damping arrangement, the dampening process comes very quickly to a still stand (FIG. 5).

The invention is not only useable with engines extended in the longitudinal direction, but also is useable for transversely disposed motors which are not further illustrated, whereby the softer damped bearings are arranged at the forward side of the motor and at least one further bearing is provided at the transmission end.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An elastic bearing assembly for a vehicle provided with a driving assembly having an engine side, a transmission side and a center of gravity comprising:
   (a) engine bearing means for resiliently supporting the engine side of the driving assembly and having a first predetermined spring stiffness; and
   (b) transmission bearing means for resiliently supporting the transmission side of the driving assembly and having a second predetermined spring stiffness less than the first predetermined spring stiffness, the engine and transmission bearing means both being substantially located in a horizontal plane which passes through the center of gravity of the driving assembly, a ratio of the first and second predetermined spring stiffnesses of the engine and transmission bearing means being selected to effect a coupling of the vertical movements of the driving assembly with the pitching movements of the driving assembly to the exclusion of all other vibrational movement of the driving assembly and during externally induced vibration of the driving assembly the ratio of the first and second spring stiffnesses resulting in the pitching and vertical movements of the vehicle driving assembly having frequencies at a ratio of approximately 2:1 with respect to one another, the movement of the engine bearing means, having a stiffer predetermined spring stiffness, being retarded by the movement of the transmission bearing means.

2. An elastic bearing assembly according to claim 1, in which the driving assembly includes an engine having a front wall from which a plurality of cylinders are arranged so that a separating plane exists between a first cylinder adjacent the front wall and a second cylinder adjacent the first cylinder of the engine, the engine being mounted longitudinally in the vehicle, wherein the engine bearing means are positioned substantially between the front wall of the engine and the separating plane between the first and second cylinders of the engine.

3. An elastic bearing assembly according to claim 1, in which the driving assembly includes a transmission having a swinging arm region wherein the transmission bearing means are positioned substantially at the swinging arm region of the transmission with as large a distance as possible from the location of engine bearing means.

4. An elastic bearing assembly according to claim 1, wherein the bearing means having a stiffer predetermined spring stiffness has rubber-type bearings and the other bearing means has hydraulic damping bearings.

5. An elastic bearing assembly according to claim 1, wherein the ratio of the spring stiffness of the engine bearing means to spring stiffness of the transmission bearing means is about 3.75.

* * * * *